United States Patent [19]

West et al.

[11] Patent Number: 4,574,815
[45] Date of Patent: Mar. 11, 1986

[54] ROTOR FOR AN AXIAL FLOW ROTARY SEPARATOR

[75] Inventors: Neil L. West, Bettendorf, Iowa; Bernard F. Vogelaar, Moline, Ill.

[73] Assignee: Deere & Company, Moline, Ill.

[21] Appl. No.: 646,393

[22] Filed: Aug. 29, 1984

[51] Int. Cl.[4] ............................................. A01F 7/06
[52] U.S. Cl. ................................................. 130/27 T
[58] Field of Search ............... 130/23, 27 T, 30 H; 209/289, 290, 291; 198/613, 693

[56] References Cited

U.S. PATENT DOCUMENTS

| 2,617,518 | 11/1952 | Anderson | 198/613 |
| 4,178,942 | 12/1979 | Nusser | 130/23 |
| 4,271,956 | 6/1981 | Hutchinson | 198/613 |
| 4,408,618 | 10/1983 | Witzel | 130/23 |

Primary Examiner—Jay N. Eskovitz

[57] ABSTRACT

In an axial flow rotary separator, each radially extending finger-like crop-engaging element of the rotor is individually and obliquely journaled on a fixed eccentric shaft. Push bars spaced 90 degrees apart rotate about the axis of the separator to drive the fingers so that the finger tips describe a circular path eccentric to the separator casing and inclined to its axis. The plane of rotation of the fingers and the speed of rotation of the rotor are chosen so that the fingers maintain the crop material in an annular mat in contact with the inside wall of the casing and propel it spirally downstream. Finger element bearing housings are split for convenient assembly and repair.

19 Claims, 4 Drawing Figures

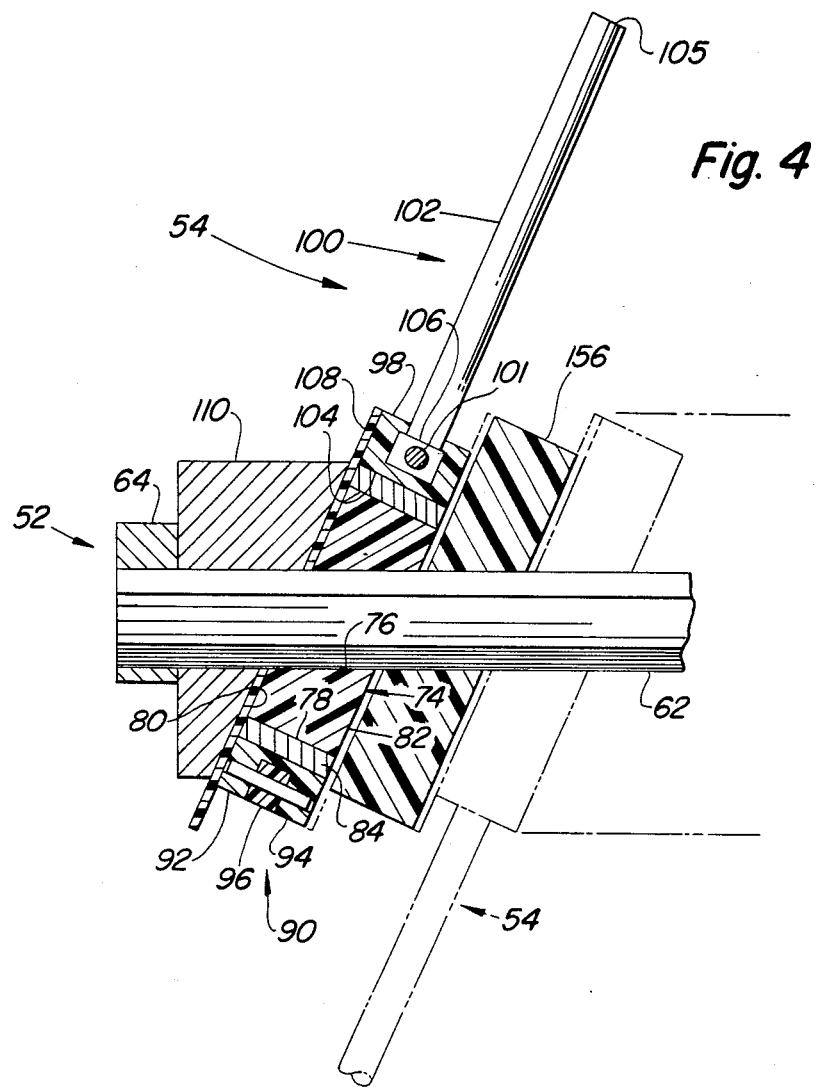

ROTOR FOR AN AXIAL FLOW ROTARY SEPARATOR

CROSS REFERENCES TO RELATED APPLICATIONS

U.S. patent application Ser. No. 646,349 filed simultaneously herewith in the names of Hall et al, entitled FEEDING ARRANGEMENT FOR AN AXIAL FLOW ROTARY SEPARATOR and assigned to the assignee of the invention herein, is directed in a preferred embodiment to a twin rotor axial flow separator for a combine in which threshed material is delivered overshot fashion downwardly towards the bite between contra-rotating rotors sharing a common feed casing. To the extent that the invention disclosed and claimed in application Ser. No. 646,349 is disclosed herein, it is done so only for completeness of description of the operative environment of the invention claimed herein and thus forms no part of the invention claimed herein.

U.S. patent application Ser. No. 646,346 filed simultaneously herewith in the name of Hall et al, entitled AXIAL FLOW ROTARY SEPARATOR and assigned to the assignee of the invention herein, is directed in a preferred embodiment to an axial flow rotary separator in which axial displacement of crop material depends on helical guide surfaces in the separator casing while finger-like elements of the rotor provide circumferential propulsion but are free to deflect downstream to facilitate the flow of crop material through the separator. To the extent that the invention disclosed and claimed in application Ser. No. 646,346 is disclosed herein, it is done so only for completeness of description of the operative environment of the invention claimed herein and thus forms no part of the invention claimed herein.

BACKGROUND OF THE INVENTION

The invention concerns a rotor for an axial flow rotary separator of the type in which crop material engaging elements of the rotor periodically engage material and propel it in a spiral path within a generally cylindrical casing and, particularly, the arrangement of the crop material engaging elements of the rotor.

It is convenient in this context to refer to individual crop material engaging elements as fingers. Successful function requires only that the elements, finger-like, periodically penetrate and withdraw from the crop material mat. Clearly, this requirement may be met by other forms than the simple round rods disclosed by Witzel (U.S. Pat. No. 4,408,618) and in the present application. For example, elements may be tapered, of various cross-sectional shapes, or bifurcated.

Witzel has disclosed a number of rotors for an axial flow rotary separator in which fingers of the rotor each engage the crop material only intermittently but, while in engagement, propel it axially downstream as well as circumferentially. All of the rotors disclosed by Witzel are relatively complex. The simplest embodiment suggested by his disclosure may be described with reference to his FIG. 5. The rotor consists of a bank of finger wheels, each with several fingers, carried on a common fixed shaft, eccentric with respect to the separator casing. The finger wheels are rotatably driven by a surrounding cage or drum concentric with the separator casing. The planes of rotation of the finger wheels are parallel to each other but inclined with respect to the separator casing axis.

One disadvantage of having several circumferentially spaced fingers on a single finger wheel is that, even though they are circumferentially spaced, each finger follows essentially the same oblique path with respect to the casing. Material handling and separating function may be improved by a more dispersed finger pattern but the opportunities of achieving this, for example by relative axial offset between the circumferentially spaced fingers on a single wheel, are limited. And when, as suggested by Witzel, a cage or drum is used, to provide rotational drive for the finger wheels and also provide surfaces contributing to material control and facilitating positive retraction of fingers from the crop material mat, further disadvantages are inherent in the configuration. Because of the eccentricity between finger wheel and drum or cage, the rotational speed of the finger wheel, driven by the drum, is non-uniform constantly accelerating and decelerating even though the drum is driven at constant speed. And the geometry is such that relatively wide slots must be provided in the drum to accommodate the relative displacement, in a circumferential direction, between the fingers and the sides of the drum slots. Wide slots in the drum provide more opportunity for crop material to find its way inside the drum, possibly upsetting rotational balance or causing blockages through wrapping the finger wheel assemblies. Further, the constant transfer of the actual propulsion of the finger wheel from one finger to the next as the rotor rotates, may result in undesirable noise, wear and vibration.

SUMMARY OF THE INVENTION

Accordingly it is an object of the invention to provide, in an axial flow rotary separator, a rotor of the type which includes crop material engaging elements which engage the crop material mat only intermittently to propel it spirally downstream which is structurally simple and potentially low in manufacturing cost, easily assembled to provide a desired pattern of distribution of crop material engaging elements and readily adjustable to change the pattern to suit particular applications.

According to the invention, a plurality of crop material engaging element (or finger) assemblies are stacked on a shaft carried offset with respect to the axis of a generally cylindrical separator casing. In each assembly, the functional finger portion is confined to a single generally radial direction with respect to the rotatable bearing hub which carries it. Each assembly is received onto the shaft by the canted bore of a bearing block mating with the shaft. Means are provided for holding the bearing blocks non-rotatably on the shaft so that, in assembly, the planes of rotation of the fingers may be all parallel to one another but inclined to the axis of the rotor and casing. The rotor includes a cage or drum drivably rotatable about an axis of rotation approximately coinciding with the longitudinal axis of the casing and including at least two longitudinally extending push bars which, on rotation of the cage, between them engage fingers and drive them in their respective oblique planes. The length of the fingers and the eccentricity of their mounting are such that in operation, a push bar may remain in constant driving contact with a given finger while the finger, or at least its crop engaging radial extremity, passes through a zone of engagement, where it penetrates the crop material mat and approaches the inside of the separator casing, and then through an opposite zone of disengagement.

Preferably, the cylinder of revolution described by the push bars provides an annular clearance between push bar and casing sufficient for the maximum designed throughput of the separator, so that the push bar does not interfere with the crop material mat during its spiral progress through the separator. It is also desirable that while in the zone of disengagement, the finger is retracted radially to at least approximately flush with the radially outward portion of the push bar, preferably for an arc of say 120 degrees or so.

Treating each crop engaging element assembly separately and assembling them in a stack on the shaft makes it convenient and feasible to achieve, if desired, a relatively close axial spacing without having a plurality of crop engaging elements following the same circular path. Also, by providing two or more push bars, individual crop engaging elements or element assemblies can be selectively and adjustably circumferentially spaced, one from another, to suit a particular functional objective.

It is an advantage of the invention that if a drum-like structure is used, incorporating push bars or pushing surfaces, only relatively narrow slots are needed between the bars to accommodate the fingers. Making the slots in the drum so narrow as to provide only running or sliding clearance for the crop material engaging elements keeps each element under close control reducing the possibility of "bounce" of the element on the push bar surface and helping to minimize noise and vibration. A narrow slot also helps to provide more positive stripping as the finger retracts into the drum, helping to maintain material control in more difficult crop conditions.

In keeping with the invention and its objectives of simplicity and cost reduction, the canted bore of the finger assembly bearing block and the rotor carrying shaft may be shaped in cross section as mating regular prisms—hexagonal for example. Convenience in assembly, repair or changing finger spacing or pattern, may be facilitated by splitting the finger carrying outer race of the finger bearing, permitting installation and removal of fingers without removing the carrier shaft from the machine.

BRIEF DESCRIPTION OF THE DRAWINGS

FIG. 4 is an enlarged sectional view taken approximately on line 4—4 of FIG. 2 showing some details of the crop material engaging element assemblies and their support.

DESCRIPTION OF THE PREFERRED EMBODIMENT

Figure 1:
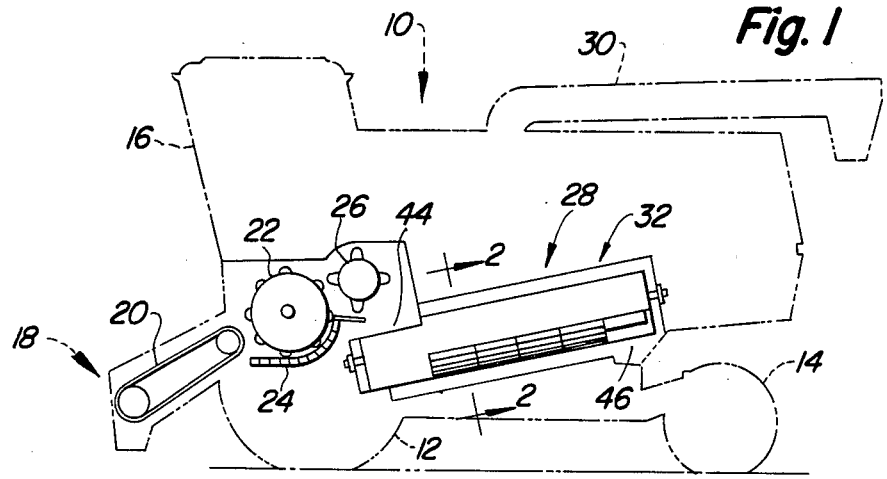
FIG. 1 is a semi-schematic left-hand side elevation of some of the principal functional components of a self-propelled combine embodying the invention, with the combine body shown only in phantom outline.

The invention is embodied in a self-propelled combine, the general outline of which is indicated in FIG. 1. The combine body 10 is supported above the ground on front drive wheels 12 and steerable rear wheels 14 and controlled from an operator's station 16. As the combine advances, crop material is gathered by a header 18 (shown only partially in FIG. 1) and elevated by a feeder-conveyor 20 to a conventional threshing cylinder and concave 22, 24, respectively. Material emerging from the rear of the threshing zone between cylinder and concave is diverted by beater 26 into an axial flow rotary separator assembly 28. Not shown in the drawings are the means for collecting threshed and separated grain beneath the concave 24 and separator assembly 28, the cleaning shoe, or means for elevating clean grain to a holding tank for eventual discharge from the machine by an unloading conveyor 30, but these are assumed to be conventional.

Axial flow rotary separators per se are well known and such separators have been disclosed in a variety of environments. For example, U.S. Pat. No. 4,408,618 Witzel, hereby incorporated by reference, discloses two configurations. In both, the separator rotors extend fore-and-aft. In one a single rotor is undershot fed and in the other, a twin side-by-side separator arrangement is fed overshot fashion. In other known arrangements, the separator axis extends transversely. The present invention has potential application in any axial flow rotary separator, in any vehicle configuration and with any of a variety of feeding arrangements. It will be assumed here, that although not shown in the drawings, the arrangement is similar to that of Witzel's FIGS. 2 and 3,—that is twin side-by-side axial flow rotary separators with overshot feed, as at least partially indicated in FIG. 1 of the present application.

Rotors according to the invention, have potential application in any axial flow rotary separator where the separator casing is of a form which permits a rotor to be mounted with effective eccentricity, as in a cylindrical casing for example. In conjunction with the rotor, the form of the casing must permit intermittent engagement of a crop material mat by crop engaging elements of the rotor as the elements propel the mat generally spirally downstream. Rotor elements according to the invention also have potential application in conjunction with specific rotor elements in the infeed, transitional, threshing, separating and discharge portions of a separator, in cooperation with casings which may be "solid" or foraminous. In some axial flow rotary separator configurations, coaxial rotor portions may perform all the functions just enumerated although, of course, in the present embodiment (FIG. 1), a conventional circumferential flow threshing arrangement is used ahead of a axial flow separator. Thus the separator structure is here required only to provide infeed (receiving), separating and discharge functions while conveying generally spirally downstream.

Figure 2:
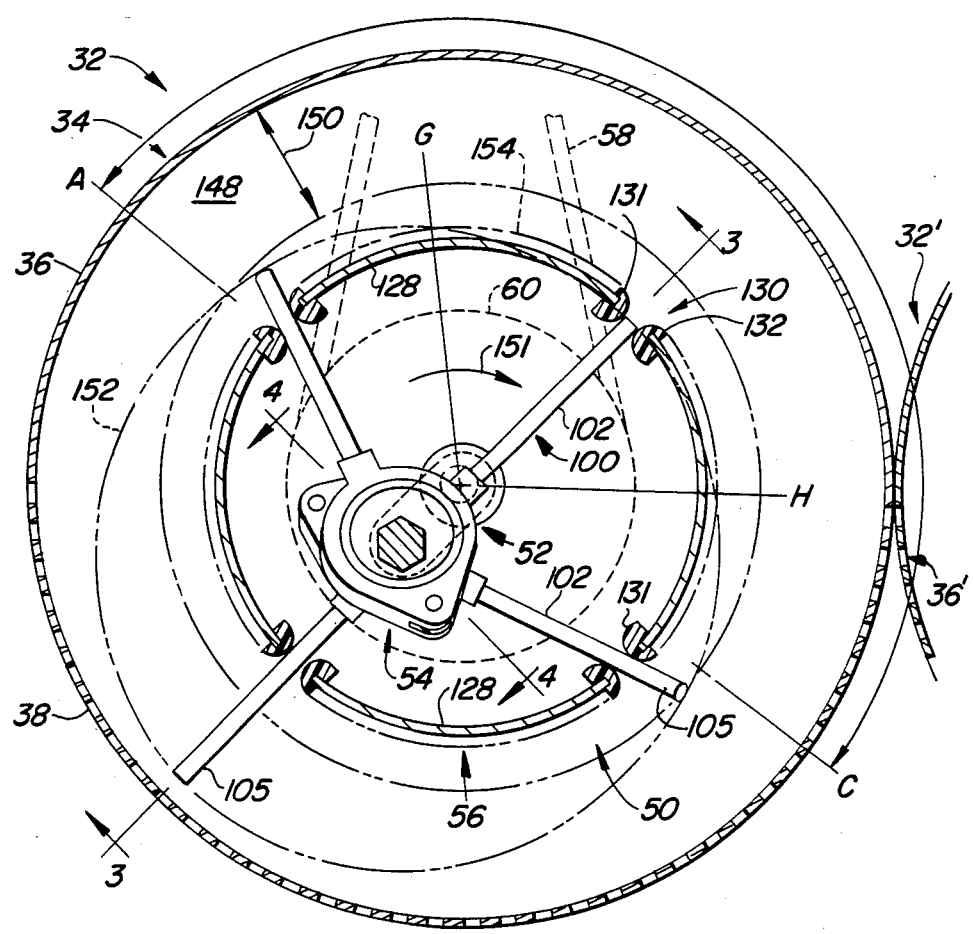
FIG. 2 is an enlarged cross-sectional view of the right-hand portion of the separator taken approximately on line 2—2 of FIG. 1.
Figure 3:
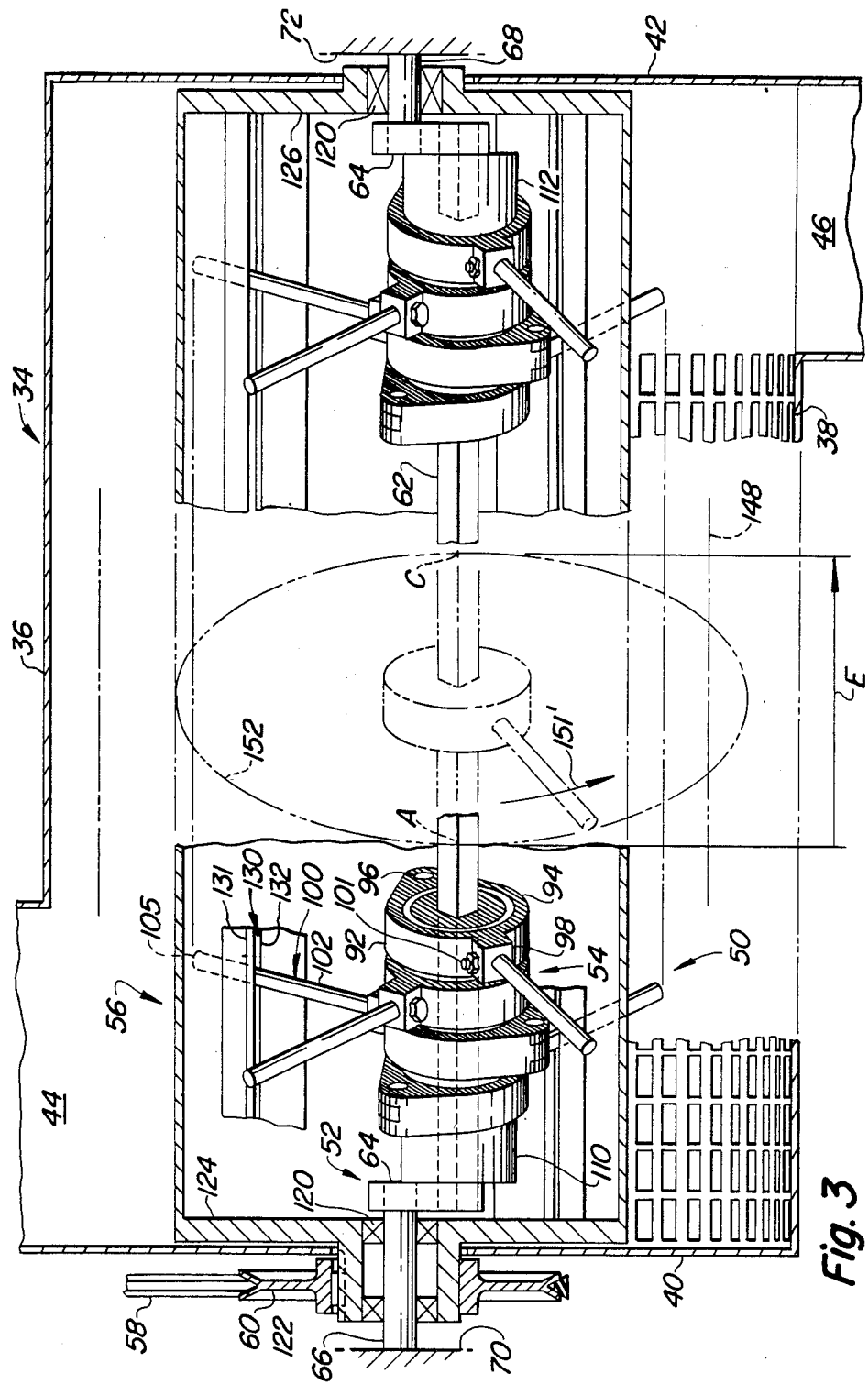
FIG. 3 is a partially sectional view on a plane through the longitudinal axis of the separator portion, taken on line 3—3 of FIG. 2.

Looking now at details of the separator structure and referring particularly to FIGS. 2 and 3 which represent the right-hand portion 32 of the complete separator assembly 28, the separator casing 34 has a cylindrical wall 36 approximately tangential to the casing wall 36' of the left-hand separator portion 32'. Within the separator portion proper a foraminous section 38 occupies approximately the bottom half of the casing. Front and rear end walls 40 and 42, respectively, help to define an upstream inlet 44 and a downstream outlet 46.

In the rotor assembly 50, a fixed cranked shaft assembly 52 carries a plurality of crop-engaging element assemblies 54 and has journaled on it a rotatable driving frame or push bar assembly 56. The latter is driven from a power source on the combine (not shown) through a V-belt 58 and a drive sheave 60 keyed to the push bar assembly 56.

The fixed cranked shaft assembly 52 comprises a hexagonal shaft 62 extending almost the full length of the separator casing 34, a pair of crank or web portions 64 offsetting the shaft 62 from upstream and downstream stub shaft portions 66 and 68, respectively. The stub shafts 66, 68 are fixedly supported by front and rear frame portions, 70, 72 respectively, of the combine body 10.

Each crop engaging element assembly 54 includes a canted bearing block 74, seen best in FIG. 4, cylindrical in shape and with a central inclined hexagonal bore 76 dimensioned to be a sliding fit on the shaft 62. The cylindrical surface 78 of the bearing block 74 is a radial bearing surface while the upstream and downstream faces 80 and 82, respectively, may be regarded as thrust bearing faces. An annular bearing bushing or collar 84 rides on the radial bearing surface 78 of the bearing block.

The bearing outer race or finger hub member 90 is split into two halves 92, 94 connected at a hinge 96. The outer race halves 92, 94 come together opposite the hinge 96 to form a socket boss 98 in which a finger 100 is retained by a bolt and nut assembly 101 which also holds the outer race 90 closed so that its inner cylindrical surface 104 is journaled on the bearing bushing 84. The finger 100 extends radially with respect to the rotational bearing surfaces (78, 104). Its straight shank 102 has a crop-engaging extremity or tip 105 and it is retained in the outer race 90 by an enlarged root section 106 through which the retaining bolt 101 passes.

As indicated in FIG. 3, a series of crop-engaging element assemblies 54 is stacked on the shaft 62 spanning almost the complete length of the separator between the front and rear bulkheads or walls 40, 42, respectively. As seen best in FIG. 4, these crop-engaging element assemblies are threaded onto the hex shaft 62 so that they share a common inclination which is maintained by the non-rotatable engagement of the hex bores 76 of the bearing blocks 74 with the hex shaft 62 itself. A thrust washer 108 is provided between each assembly 54. End blocks or adapters, front and rear, 110 and 112, respectively, hold the crop-engaging element assemblies in axial position with a predetermined minimum running clearance between them.

The push bar or drum assembly 56 encloses the shaft assembly 52 and is journaled on it by bearings 120 running on the stub shafts 66, 68. A forward hub 122 carries the drive sheave 60. In this embodiment, the form of the push bar assembly is essentially cylindrical. Front and rear end walls 124, 126, respectively, carry (by some suitable attaching means) four equal partially cylindrical wall portions 128, the edges of which help define a set of four equally spaced axially extending slots 130. The opposing edges of these slots are modified by semicylindrical push bars 131, 132, respectively. The width of each resulting slot 130 is such as to closely confine each of the fingers 100 and particularly their crop-engaging tip portions 105 as they extend through and oscillate in the slots.

In operation, crop material emerging from the threshing zone of the cylinder and concave (22, 24) and consisting mostly of straw with grain and chaff mixed in, is diverted by the beater 26 through the inlet 44 into the separator right-hand portion 32. (The separator assembly 28 is symmetrical about a fore-and-aft centerline of the combine body 10 and only one half need be described.) There it is engaged by the crop material engaging element (finger) assemblies 54 and begins its spiral path through the casing 34. The rotor assembly 50 is driven at such a speed that the crop material is distributed and maintained by centrifugal force in a generally annular mat 148 in contact with the inside of the casing wall 36 with a typical nominal thickness of mat indicated at 150 in FIG. 2.

The principles of operation of separators with rotors having intermittently or periodically engaging end spirally propelling finger-like elements is described in considerable detail by Witzel in U.S. Pat. No. 4,408,618. Those principles will be discussed only briefly here, with particular reference to the present invention.

In the rotor assembly 50, the directly driven element is the push bar assembly 56 and particularly, the push bars 131. Direction of rotation is indicated by arrows 151, 151' in FIGS. 2 and 3, respectively. The effective outside diameter of the push bar assembly (or drum) 56; the eccentricity of the finger assemblies 54 with respect to the casing and push bar assembly axis; and the swing radius of the finger tip portions 105, are all chosen so that as the rotor rotates, all fingers 100 remain in engagement with one of the slots 130 so that all fingers are in continuous rotation. [Note that it is not essential, but usually preferred, that the drum assembly (56) be concentric with the separator casing (34)].

The circular path 152 of the radial extremity of the finger tip 105, inclined to the longitudinal axis of the casing 34 is indicated in FIGS. 2 and 3. Overall dimensions of the separator are chosen and preferably feed rates of crop material are controlled so that there is a period of disengagement of the finger 100 from the mat 148. The nominal extent of this disengagement is indicated by the arc A to C with a corresponding period of engagement C to A, both corresponding to approximately 180 degrees of rotor rotation. The potential downstream axial indexing effect of this engagement is indicated in FIG. 3 by the vector E.

Actual mechanical retraction of the finger 100 with respect to the cylindrical surface 154, generated by rotation of the push bar or drum assembly 56, may be regarded as a secondary operational characteristic of the rotor which, however, may be important in some operating conditions. This characteristic is exemplified in the present embodiment and indicated in FIG. 2 by the arc G to H where the fingertip 105 (in circular path 152) lies inside the cylindrical surface 154 swept by the push bar assembly 56. Preferably this arc should be 90 degrees or more.

Looking now at the structure of the rotor—the cranked form is convenient for shaft assembly 52 but it is only necessary, for this embodiment, that the functional portion 62, extending through the separator casing, be fixed in position, effectively eccentric with respect to the casing 34. The prism form (as in the hexagon here) is convenient for the shaft 62 but of course, other means of controlling the timing of the bearing blocks 74 may be used—for example, with keyways or set screws on a round shaft.

It may be noted here, that as described by Witzel, the fixed cranked configuration for the finger shaft assembly (52) may be regarded as a species of a more generic form in which both the shaft and the drum (56) are driven. Circumferential propulsion depends entirely on "drum" speed and preferably the drum is always driven fast enough for the fingers to maintain the crop material in an annular mat. Axial indexing derives only from relative rotation between finger shaft and drum. Relative speed may therefore be used to control rate of throughput of the separator.

To minimize friction and hence power consumption in operation, and also to reduce service requirements, the surfaces (78 and 104) in the crop engaging element assembly 54 at which relative motion occurs, may be of self-lubricating materials such as powdered metal. It will be understood that satisfactory bearing arrangements may be devised which do not include the bearing bushing 84 of the present embodiment.

The split form used for the bearing outer race 90 which includes a retaining feature for the finger 100 is potentially low in cost and convenient for assembly and repair or replacement of fingers. The form used here which requires only a single fastener (nut and bolt 101) is a particularly useful design in this application. A finger assembly of this form, used in another environment, is described in more detail in U.S. Pat. No. 4,271,956, Hutchinson et al, also assigned to the assignee of the present application.

A "closed" push bar assembly 56 has been used in this exemplary embodiment. However, the only essential functional requirement is one or more push bars, such as a push bar 131 to drive the fingers 100 as the push bar is rotated around a center eccentric to the fixed shaft 62. But, a push bar assembly including a slot 130 has operational advantages in some conditions, and in some applications, the shielding effect provided by the partially cylindrical filler pieces 128 may enhance performance.

Other advantages of separators including rotors according to the invention, include the ease of assembling rotors to particular specifications facilitated by the "unitizing" of the finger assembly 54, particularly when used in conjunction with push bar assemblies 56 including more than one push bar 131 or slot 130. A particular dispersed pattern of finger extremities 105 may be chosen to suit the portion of the separator (upstream end vs. downstream end, for example) or the crop which the rotor portion will be handling. Thus, with the four push bar/slot arrangement of the present embodiment, successive fingers may be rotationally spaced, for example, 90 degrees apart in either direction or at 180 degrees. Axial spacing in the dispersal pattern may, of course, be controlled and varied by using spacers such as spacer 156 (FIG. 4), on the shaft 62 between the finger assemblies 54.

An important advantage of the unitized finger assembly when used with a simple eccentric drive arrangement as here, is that the (single) finger remains in constant engagement with its push bar. This avoids the noise and vibration which may occur when each finger assembly has fingers extending in fixed relationship in several radial directions and more than one push bar is used. If the push bars are slotted, the slots must be relatively wide to accommodate relative circumferential displacement between push bar and finger. It is the nature of such combinations that, as the rotor rotates, the driving force and contact between push bar and finger is progressively transferred from one push bar to the next resulting in an intermittent drive with potential wear and vibration problems.

We claim:

1. An axial flow rotary separator for receiving, processing and forwarding crop material comprising:
   a tubular, generally cylindrical casing having an inside surface and a central longitudinal axis;
   an elongated support extending within the casing and offset from the longitudinal axis of the casing;
   a plurality of crop material engaging elements, each element including a single elongated finger;
   means for axially spacing the crop-engaging elements on the support and means for journalling the elements individually on the support so that each element is rotatable about the support in a selected plane of rotation oblique to the longitudinal axis of the casing, the planes of all adjacent elements of the plurality being parallel one to another;
   first drive means extending within the casing for engaging some of the crop-engaging elements and drivably rotating them in a first array about the support, said drive means engaging each element at a first point of contact; and
   second drive means for engaging others of the crop-engaging elements and drivably rotating them in a second array about the support, said second drive means engaging each element of said second array at a second point of contact, said first and second points of contact normally being spaced apart circumferentially.

2. The separator of claim 1 wherein the planes of rotation are disposed so that received crop material engaged by the fingers is conveyed by the fingers spirally within the casing.

3. The separator of claim 1 wherein the first and second drive means are disposed so that the first and second points of contact with the elements are spaced 180 degrees apart and wherein said first and second arrays each span a significant portion of the length of the casing and wherein said spanned portions axially overlap.

4. The separator of claim 1 wherein each crop material engaging element includes a hub portion for journalling it on the support and the finger extends radially from the hub, parallel to the plane of rotation defined by the hub.

5. The separator of claim 1 wherein the support means includes a shaft extending parallel to the casing longitudinal axis and wherein for each crop-engaging element, the means for journalling includes an individual bearing block nonrotatably carried by the shaft.

6. An axial flow rotary separator in which a rotor propels crop material in a generally spiral path through a generally cylindrical casing, the casing having a longitudinal axis and the rotor including at least one array of finger-like elements each of which has a crop engaging portion with a radial extremity, each radial extremity being propelled in a circular path inclined to the axis of the casing, the circular paths of adjacent elements being parallel one to another, and the rotor being driven at such a speed that crop material engaged by it is maintained by centrifugal force in an annular mat generally in contact with the inner surface of the casing and the rotor being disposed so that the finger-like elements engage the crop material only intermittently but, while in engagement, themselves produce a downstream movement of the crop material while propelling it circumferentially, characterized in that the rotor includes:
   an elongated shaft supported approximately parallel to but eccentric from the axis of the casing;
   a plurality of individual crop engaging element assemblies threaded onto and stacked axially on the shaft, each crop engaging element assembly including:

a canted bearing block having a central canted bore receivable nonrotatably by the shaft, an inclined bearing surface extending circumferentially with respect to the bore, and opposite parallel, spaced-apart upstream and downstream walls;

a finger hub journaled on the circumferential bearing surface of the bearing block;

one of the finger-like crop engaging elements carried by the hub and extending generally radially; and a rotor driving frame supported for rotation about an axis approximately parallel to the casing axis and including an elongated generally axially extending push bar radially spaced from the axis of rotation and engageable with some of the elements for drivably rotating them;

so that in operation, when the driving frame is rotated, the push bar engages at least one crop engaging element assembly, propelling it rotatably about its canted bearing block.

7. The separator of claim 6 wherein the swing radius of the radial extremity of each finger-like element relative to the shaft is not less than approximately equal to the sum of the swing radius of the push bar relative to the axis of rotation of the driving frame plus the distance between the shaft and the axis of rotation of the frame so that in operation, each crop material engaging element assembly is in continuous driven contact with a push bar and so that the radial disposition of the radial extremity of the element with respect to the push bar varies from approximate radial coincidence to a maximum projection radially outward of the push bar equal to or greater than the spacing between the shaft and the axis of rotation of the frame.

8. The separator of claim 6 wherein the driving frame includes at least two diametrically opposed push bars and wherein, in operation, successive crop engaging element assemblies are rotationally spaced one from another.

9. The separator of claim 8 wherein the driving frame includes a drum wall extending substantially between each adjacent push bar, said walls collectively constituting a drum substantially enclosing the shaft.

10. The separator of claim 9 wherein the drum is substantially cylindrical.

11. The separator of claim 6 wherein the structure of the push bar defines an approximately axially extending elongated slot and wherein the crop engaging element extends within and is controlled by said slot.

12. The separator of claim 11 wherein the slot is so narrow as to substantially prevent relative circumferential movement between the finger-like element and the push bar.

13. The separator of claim 6 wherein the dimensions and configuration of the push bar, the crop engaging element assembly and the shaft eccentricity relative to the casing are such that the radial extremity of the crop engaging element extends radially beyond the push bar during not more than about 270 degrees of rotation of the rotor.

14. The separator of claim 6 wherein the driving frame includes a plurality of circumferentially spaced push bars.

15. The separator of claim 6 wherein the finger hub includes portions separable circumferentially to facilitate assembly and removal of the crop engaging element assemblies to and from the shaft.

16. The separator of claim 6 wherein the shaft and the bore of the bearing block are of matching noncircular cross-sectional shapes.

17. The separator of claim 16 wherein the cross-sectional shapes of the shaft and of the canted bearing block bore are similar regular prisms.

18. The separator of claim 6 wherein the shaft is fixed with respect to the casing.

19. The separator of claim 6 wherein the longitudinal axis of the casing and the axis of rotation of the driving frame approximately coincide.

* * * * *